W. HUDGIN.
Car Wheel and Axle.
No. 111,543                  Patented Feb. 7, 1871.
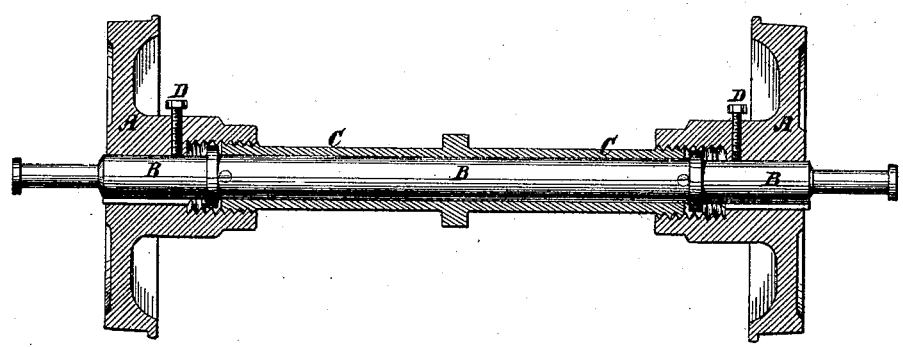

UNITED STATES PATENT OFFICE.

WESCOM HUDGIN, OF ATHENS, GEORGIA.

IMPROVEMENT IN WHEELS AND AXLES FOR RAILWAY-CARS.

Specification forming part of Letters Patent No. 111,543, dated February 7, 1871.

*To all whom it may concern:*

Be it known that I, WESCOM HUDGIN, M. D., of Athens, in the county of Clarke and State of Georgia, have invented a new and useful Improvement in Wheels and Axle for Railroad-Cars; and I do hereby declare that the following is a full, clear, and exact description thereof, which will enable others skilled in the art to make and use the same, reference being had to the accompanying drawing, forming part of this specification, in which the figure is a detail sectional view of my improved wheels and axle.

My invention has for its object to furnish an improvement in the construction of wheels and axles for railroad-cars, which will enable cars to be readily and quickly adjusted to run upon a wider or narrower track, as may be required; and it consists in the construction and combination of the various parts of the wheels and axle, as hereinafter more fully described.

A are the wheels, which are made with long hubs, say twenty inches, more or less, in length. The wheels A are placed upon the end parts of the axle B, and are made to carry the said axle with them in their revolution by feathers and grooves.

C is a sleeve fitted upon the axle B, and having a right and left screw-thread cut upon its ends. The sleeve C is kept in place upon the axle B by collars formed upon or attached to the said axle, against which the ends of the said sleeve rest, or by having the ends of the sleeve rest against the inner ends of the keys that connect the wheels A and axle B.

The inner ends of the hubs of the wheels A have their interior cavities enlarged for the distance of eight inches, more or less, from said ends, and have screw-threads cut in them to fit into the screw-threads cut upon the ends of the sleeve C, so that by turning the said sleeve in one or the other direction the wheels may be moved closer together or farther apart upon said axle, as may be desired, to adjust them for running upon a narrow or wide track.

The sleeve C may have a nut formed upon or attached to its middle part for a wrench to take hold of to turn it; or the said sleeve may be made without said nut, and turned with a pipe-wrench or similar tool.

The wheels A may be secured to the axle B when adjusted by set-screws D, which should be secured in place when adjusted by lock-nuts. The sleeve C may also be secured to the axle B by a set-screw.

This construction will not only enable the wheels to be readily adjusted for tracks of different gages, but will also furnish a stronger and safer axle than the single solid axle now in use, as the sleeve C alone, should the axle B be broken, would support the weight for a long time or distance.

Having thus described my invention, I claim as new and desire to secure by Letters Patent—

The sleeve C, having right and left screw-threads formed upon its ends to screw into the inner ends of the hubs of the wheels A, in combination with the wheels A and axle B, substantially as herein shown and described, and for the purpose set forth.

WESCOM HUDGIN, M. D.

Witnesses:
  E. P. BISHOP,
  JAMES McCULLOCH.